United States Patent [19]

Allan et al.

[11] 4,154,702

[45] May 15, 1979

[54] POLYOLEFIN CATALYST

[75] Inventors: John L. H. Allan, Glen Rock; Birendra K. Patnaik, Parsippany, both of N.J.

[73] Assignee: Dart Industries Inc., Los Angeles, Calif.

[21] Appl. No.: 908,485

[22] Filed: May 22, 1978

[51] Int. Cl.$^2$ ................................................ C08F 4/64
[52] U.S. Cl. .................................. 252/429 B; 526/137
[58] Field of Search ...................................... 252/429 B

[56] References Cited

U.S. PATENT DOCUMENTS 4,095,016  6/1978  Carrock et al. .............. 252/429 B X

*Primary Examiner*—Patrick Garvin
*Attorney, Agent, or Firm*—Margareta LeMaire; Bryant W. Brennan

[57] ABSTRACT

Phosphorus oxytrichloride modified titanium trichloride polymerization catalysts of improved efficiency and/or isotacticity are obtained when the modification reaction is carried out in the presence of methylene chloride.

14 Claims, No Drawings

POLYOLEFIN CATALYST

BACKGROUND OF THE INVENTION

Recently considerable efforts have been made in developing α-olefin polymerization catalysts of improved efficiency and sterospecificity as compared to conventional Ziegler-type catalyst systems. One such catalyst composition which has shown considerable promise, is the modified Ziegler catalyst disclosed in British Patent Specification No. 1,468,503. Specifically, the improved performance of this composition is attributable to a modification of the titanium trichloride component by reacting the titanium trichloride with phosphorus oxytrichloride at elevated temperatures, most preferably in the range from 80° C. to 100° C., in the presence of an aromatic hydrocarbon diluent, such as benzene, and in the absence of the organoaluminum component. It is disclosed that inferior results are obtained if other diluents such as aliphatic hydrocarbons are used.

Inasmuch as aromatic diluents such as benzene are highly toxic and flammable, the use thereof in the preparation of the modified titanium trichloride component at the required elevated temperatures, gives rise to a number of problems in maintaining a working environment wherein safety and health hazards are minimized.

It is, therefore, an object of the present invention to provide a process for the production of a phosphorus oxytrichloride modified titanium trichloride component of an olefin polymerization catalyst composition, wherein such hazards are significantly reduced.

Another object of the present invention is to provide an olefin polymerization catalyst composition containing a phosphorus oxytrichloride modified titanium trichloride component which catalyst exhibits improved efficiency and sterospecificity.

A further object is to provide a process for the production of an olefin polymerization catalyst wherein the energy requirements of the process are significantly reduced.

Still another object is to provide an olefin polymerization process of improved yield and polymer quality.

Further objects will become apparent from a reading of the detailed description of the invention and the appended claims.

THE INVENTION

In accordance with the present invention, there is provided a process for the preparation of a modified titanium trichloride component of an olefin polymerization catalyst composition containing an organoaluminum cocatalyst component which process comprises heating titanium trichloride with phosphorus oxychloride in the presence of liquid methylene chloride for at least 0.25 hours at a temperature in the range from about −20° C. to about 60° C. When the modification reaction is carried out at temperatures exceeding 40° C., a sufficient pressure should be imposed on the system to insure that methylene chloride diluent is present in the liquid phase. Preferably the reaction is carried out at temperatures in the range of about 30° C. to about 40° C.

The relative proportions of titanium trichloride and phosphorous oxytrichloride should be such that the atomic ratio of Ti:P ranges between about 1:1 and about 100:1 preferably between about 2:1 and about 20:1 and most preferably between about 3:1 and about 10:1.

The titanium trichloride should preferably be a violet titanium trichloride and most preferably one that is obtained by reduction of titanium tetrachloride with aluminum to yield cocrystals of a titanium trichloride - aluminum trichloride complex, especially in the stoichiometric relation $3TiCl_3 \cdot AlCl_3$, followed by activation by milling.

The methylene chloride is advantageously provided in amounts from between about 1 and about 10 cc/g of the titanium trichloride containing component, preferably between about 2 and about 5 cc/g. The length of the heating period should be at least 0.25 hours and preferably between 1 and 4 hours.

Agitation should be provided in some form to insure intimate contact of the reactants and the methylene chloride diluent. The agitation can be achieved merely by the boiling action of methylene chloride when temperatures about 40° C. are used. However, it is preferable that the mixture be stirred by mechanical action.

After completion of the heating period, the solids are separated, e.g. by decantation, filtration or centrifugation, and advantageously subjected to one or more washings with fresh methylene chloride. After solids separation, residual quantities of methylene chloride is removed by evaporation, e.g., by passing a heated stream of purified nitrogen through the modified titanium trichloride. The dry catalyst component is then usually ground and screened prior to its use in the polymerization reaction. The methylene chloride recovered in the solids separation step is usually purified, e.g. by distillation, before subsequent reuse.

In addition to the titanium chloride modified as described above, the catalyst should contain an organoaluminum compound selected from trialkyl aluminum, dialkyl aluminum halide and mixtures thereof. The preferred halide is the dialkyl chloride. Preferably the alkyl groups of these organoaluminum compounds contain 2 to 8 carbon atoms. The most preferred species of the organoaluminum compounds are triethyl aluminum and diethyl aluminum chloride. The relative proportions of the organoaluminum and the modified titanium trichloride components are usually such that an atomic ratio of Al:Ti is provided in the range between about 1.5:1 and about 150:1, preferably from about 1.5: to about 4:1. These ratios do not take into account any aluminum present in the modified titanium trichloride compound. The modified titanium trichloride is typically added at a rate of about 0.01 to about 0.3 percent by weight of the total monomer feed ratio.

The catalyst composition of this invention is suitable for the continuous production of both homopolymers and copolymers of α-olefins having from 2 to 8 carbon atoms per molecule. It is particularly suitable for the production of such polymers, which are known to have generally lower heptane insolubles content, such as random copolymers of propylene and another comonomer such as ethylene, butene-1, etc., or homopolymers of butene-1, pentene-1, etc.

The catalyst composition is useful in any liquid phase olefin polymerization reaction employing a hydrocarbon diluent. Of particular interest is the well known bulk or "liquid pool" process, wherein liquid monomer, e.g. propylene, functions as a liquid diluent as well as feed to the reaction. Optionally, a comonomer, such as ethylene, butene-1, pentene-1, 3-methyl butene-1, 4-methyl pentene-1, etc., is added to the reactor. The reactor conditions include temperatures generally between about 30° C. and about 90° C., preferably between about 50° C. and about 90° C. The pressure should be sufficiently elevated to maintain at least one of the monomers in liquid phase. Suitably, pressures of 10 atmospheres and higher are used. Total solids in the reaction zone, in accordance with this system, are ordinarily in the order of from 15 to 50%, although obviously lower or higher, for example, up to 60% polymer solids can be achieved. In order, however, to efficiently handle the slurry, it is preferred to keep the polymerization to the percent solids above indicated. The reaction is continuous in that monomer feed and catalyst components are continuously added to the reactor while the polymer slurry is withdrawn therefrom through a cyclic discharge valve which simulates continuous operation. If desired, various modifiers such as hydrogen may be added to alter the properties of the polymer product. Such modifiers are well known in the art and need not be discussed in any further detail since they form no part of this invention.

The withdrawn polymer slurry is let down in pressure to, for example, 50 psig or less in a low pressure zone (meaning a zone maintained at a pressure lower than that in the polymerization reaction) where due to the drop in pressure and the volatile nature of the polymerization ingredients, there is a flashing of these volatiles from the solid polymer. This flashing, which can be aided by heating, results in a polymer powder which is substantially dry and which by this term is to be understood to be a polymer containing 5% or less volatiles. The untreated monomer stream is taken overhead from this low pressure flashing zone and at least a portion thereof is compressed and condensed and returned to the reactor. The polymer may be further reacted in a subsequent block polymerization zone, if so desired, or directly passed to a deashing zone to remove catalyst residues and low molecular weight amorphous polymer by techniques well known in the art.

There are many important advantages realized in preparing and using the catalyst composition of this invention. For instance, the preparation of the modified titanium trichloride component is considerably safer and more economical than that prepared in the presence of an aromatic diluent, such as benzene, which is both toxic and highly flammable. Methylene chloride is virtually non-flammable and non-toxic (as far as is known). Furthermore, since the modification reaction is carried out generally at much lower temperatures with methylene chloride, and since methylene chloride is considerably lower boiling than benzene and, therefore, more easily removed from the catalyst component, the utility requirements of the process for producing the modified titanium trichloride are considerably reduced. Also, the modification reaction with methylene chloride can be carried out at higher solids concentration, inherently resulting in cost-savings since smaller vessels are needed and there is less solvent to recover and purify before reuse.

Equally important is the improved efficiency of the catalyst and its ability to produce a polymer of improved isotacticity i.e. having a higher heptane insolubles (HI) content. Less $POCl_3$ is needed in the modification reaction carried out in the presence of methylene chloride in order to produce a catalyst of same or better efficiency and/or stereospecificity as the prior art catalyst discussed hereinbefore. Because of the increased efficiency and/or stereospecificity the catalyst requirements in the polymerization process are proportionally reduced.

In summary, the use of the present invention results in (1) a safer and more economical production of the modified titanium trichloride component, (2) a catalyst composition which has superior activity and sterospecificity and (3) a polymerization process wherein polymer of increased yield and isotacticity is obtained.

In the comparative examples given below the procedures for preparing and evaluating modified titanium trichloride catalyst component were as follows:

MODIFICATION PROCEDURE 10.0 grams of $3TiCl_3 \cdot AlCl_3$ (Stauffer AA catalyst) is suspended in a measured quantity of diluent containing 1.30 g $POCl_3$ and the mixture is stirred during 3 hours while maintaining the temperature at the desired level. Agitation and heating is then stopped, and the suspended modified catalyst is allowed to settle. The clear supernatant liquid is then removed by decantation, and the diluent, which has been removed, is replaced by an equal volume of fresh diluent. After stirring at ambient temperature for 5 minutes, the solids are again allowed to settle and the clear supernatant liquid is removed by decantation. Residual diluent is then removed by evaporation in a stream of purified nitrogen at 60°–65° C. The dry modified catalyst is then ground to pass through a USS 100 mesh sieve and subjected to evaluation. All operations are carried out in a dry box in an atmosphere of pure nitrogen.

The resulting catalysts were evaluated using the standard heptane slurry (HS) and liquid pool (LP) polymerization tests described hereinafter.

HEPTANE SLURRY POLYMERIZATION PROCEDURE

A 500 ml stainless steel reactor is charged with 300 ml of n-heptane, 0.200 g of modified $AA-TiCl_3$ catalyst and 0.3 ml of diethyl aluminum chloride DEAC (DEAC/Ti mole ratio 2.4) inside a dry box. The reactor is sealed and placed in a preheated shaker bath at 80° C. Propylene is then introduced into the reactor continuously maintained at 44 psi. The mixture is shaken for 3 hrs. at 80° C. after which the monomer is vented off. The product polymer is treated with a mixture of isopropyl alcohol and methanol, filtered, washed with acetone, and dried in a vacuum oven for 16 hrs. at 45° C.

The catalyst efficiency is expressed as the amount in grams of polymer produced per gm of $TiCl_3$ present in the catalyst.

LIQUID POOL POLYMERIZATION PROCEDURE

A nitrogen purged (5 psi) preheated (80° C.) stainless steel jacketed 1 liter autoclave is charged with 1.4 ml of a 0.66 molar DEAC solution and then with 0.0544 g of the modified $TiCl_3$ catalyst (DEAC/Ti mole ratio 3.5). $H_2$ (10 psi) is then added followed by 250 g of propylene under pressure. The mixture is allowed to react for 2 hrs. at 80° C. with stirring, after which the monomer is vented off, the polymer collected and dried in a vacuum oven at 60° C. overnight.

The catalyst efficiency (CE) is expressed as the weight of polymer produced in grams per gram of modified $TiCl_3$ catalyst used. The heptane insoluble (HI) fraction of the polymer is determined by extraction with boiling n-heptane.

EXAMPLE 1

Modifications of titanium trichloride (AA-TiCl₃) were carried out in accordance with the procedure described above using benzene and methylene chloride as diluents. The nature and amount of diluent and the temperatures used in the modifications are shown in Table 1 below which also includes the results of the HS and LP polymerization tests, wherein the respective catalyst efficiencies were determined.

TABLE 1

| Exp. | Diluent | Diluent Vol.-cc | Temp. °C. | Cat. Efficiency HS, g/g | Cat. Efficiency LP, g/g |
|---|---|---|---|---|---|
| A | Benzene | 30 | 40 | 518 | 2390 |
|   |         |    |    |     | 2353 |
| B | Benzene | 30 | 40 | 513 | 2555 |
|   |         |    |    |     | 2546 |
| C | Benzene | 50 | 80 | 580 | 2420 |
| D | Benzene | 50 | 80 | 601 | 2316 |
| E | $CH_2Cl_2$ | 30 | 40 | 629 | 2794 |
|   |         |    |    |     | 2665 |
| F | $CH_2Cl_2$ | 30 | 40 | 632 | 2665 |
|   |         |    |    |     | 2518 |

Averaging the productivity data from Experiments A-B, C-D and E-F, the superiority of the catalyst made with methylene chloride is clearly demonstrated. Specifically, a comparison of results of catalyst prepared with 30 cc of diluent and at 40° C. shows that the catalyst made with methylene chloride exhibited a 22% increase in efficiency in the HP test and 8% increase in the LP test. The methylene chloride treated catalyst showed a gain of 7% in catalyst efficiency in the HS test and a 12% gain in the LP test when compared with the catalyst made with 50 cc of benzene at 80° C.

EXAMPLE 2

Experiment C (and D) using benzene was repeated on a larger scale thirteen (13) times. The HS activity of the products averaged 437 g. polymer/g TiCl₃ (average of 21 determinations) and the heptane insolubles (HI) averaged 93.6% (average of 26 determinations).

Experiment E (and F) using methylene chloride was repeated on a larger scale thirty-one (31) times. The HS activity of the products averaged 468 g. polymer/g TiCl₃ (average of 106 determinations) and the HI averaged 94.3% (average of 45 determinations).

The latter data show that there was an average gain in activity of 7.1% relative to benzene as solvent. The increase in HI was 0.7% which corresponds to a reduction in deashing solvent solubles of 29.2% for a polymer product deashed to a HI of 96.0%.

Thus having described the invention in detail, it will be understood by those skilled in the art that certain variations and modifications may be made without departing from the spirit and scope of the invention as described herein or in the appended claims.

What is claimed is:

1. A process for modification of the titanium trichloride component of an olefin polymerization catalyst composition containing said titanium trichloride and an organoaluminum cocatalyst component, which process comprises:

heating the titanium trichloride and phosphorus oxytrichloride in the presence of liquid methylene chloride but in the absence of the organoaluminum for at least 0.25 hours at a temperature in the range from about −20° C. to about 60° C.

2. The process of claim 1 wherein the temperature is between about 30° C. and about 40° C.

3. The process of claim 1 wherein the reaction is carried out for a duration ranging between about 1 hour to about 4 hours.

4. The process according to claim 1, wherein the methylene chloride is present in quantities from about 1 cc to about 10 cc per gram of the titanium trichloride component.

5. The process according to claim 1, wherein the methylene chloride is present in quantities from about 2 cc to about 5 cc per gram of the titanium trichloride component.

6. The process according to claim 1 wherein the proportions of titanium trichloride and phosphorous oxytrichloride are selected to provide a Ti:P ratio between about 1:1 and about 100:1.

7. The process according to claim 6 wherein the Ti:P ratio ranges between about 2:1 and about 20:1.

8. The process according to claim 6 wherein the Ti:P ratio ranges between about 3:1 and about 10:1.

9. The process of claim 1 wherein the titanium trichloride is a violet titanium trichloride.

10. The process of claim 1, wherein the titanium trichloride is a titanium trichloride - aluminum trichloride complex.

11. The process of claim 10, wherein the complex has the formula $3TiCl_3 \cdot AlCl_3$.

12. A process for the preparation of an olefin polymerization catalyst composition which comprises adding an organoaluminum compound selected from the group consisting of trialkyl aluminum, dialkyl aluminum halide and mixtures thereof to the titanium trichloride modified by the process of claim 1.

13. The process of claim 12 wherein the alkyl groups of the organoaluminum compound have from 2 to 8 carbon atoms.

14. The process of claim 12, wherein the organoaluminum compound is selected from the group consisting of triethyl aluminum, diethyl aluminum chloride and mixtures thereof.

* * * * *

UNITED STATES PATENT AND TRADEMARK OFFICE
CERTIFICATE OF CORRECTION

PATENT NO. : 4,154,702
DATED : May 15, 1979
INVENTOR(S) : John L. H. Allan and Birendra K. Patnaik It is certified that error appears in the above-identified patent and that said Letters Patent are hereby corrected as shown below:

Column 2, line 49    "ratio" should read -- rate -- .

Signed and Sealed this

Twenty-sixth Day of February 1980

[SEAL]

Attest:

SIDNEY A. DIAMOND

Attesting Officer    Commissioner of Patents and Trademarks